United States Patent [19]

Takahashi et al.

[11] Patent Number: 5,539,855

[45] Date of Patent: Jul. 23, 1996

[54] APPARATUS FOR MEASURING THE TEMPERATURE OF A SUBSTRATE

[75] Inventors: Mitsukazu Takahashi; Takatoshi Chiba; Katsuichi Akiyoshi, all of Kyoto, Japan

[73] Assignee: Dainippon Screen Mfg. Co., Ltd., Kyoto, Japan

[21] Appl. No.: 197,784

[22] Filed: Feb. 16, 1994

[30] Foreign Application Priority Data

Feb. 16, 1993 [JP] Japan .................................. 5-051597

[51] Int. Cl.⁶ ........................... A21B 2/00; F26B 19/00
[52] U.S. Cl. ...................... 392/416; 374/141; 219/411; 340/584; 118/724
[58] Field of Search .................................. 374/141, 208; 219/405, 411; 392/416, 418; 118/724, 725; 340/584

[56] References Cited

U.S. PATENT DOCUMENTS

| | | | |
|---|---|---|---|
| 5,046,858 | 9/1991 | Tucker | 374/179 |
| 5,228,114 | 7/1993 | Suzuki | 374/179 |
| 5,231,690 | 7/1993 | Soma et al. | 392/416 |
| 5,315,092 | 5/1994 | Takahashi et al. | 392/418 |
| 5,356,486 | 10/1994 | Sugarman et al. | 374/179 |

FOREIGN PATENT DOCUMENTS 0034422  2/1982  Japan .................................. 374/179

5-51597  2/1993  Japan .

*Primary Examiner*—Diego F. F. Gutierrez
*Attorney, Agent, or Firm*—Lowe, Price, LeBlanc & Becker

[57] ABSTRACT

A substrate temperature measuring apparatus includes a temperature signal generating device provided in contact with a substrate for generating a signal indicating its own temperature which follows the temperature of the substrate by thermal conduction, a device connected and responsive to the output of the temperature signal generating device for determining whether contact between the substrate and the temperature signal generating device is appropriate or not, and a device for carrying out a predetermined process according to a determination result of the determining device. It is possible to apply heat treatment to the substrate, to prevent the substrate from being subjected to heat treatment, or to give a necessary alarm according to the determination result. Since the next substrate is at room temperature when it first comes into contact with the temperature signal generating device after heat treatment, the temperature signal generating device lowers its temperature rapidly in such a manner that reflects a state of contact between the substrate and the temperature signal generating device. Based on change of the output of the temperature signal generating device at this time, it is possible to detect an undesired state of contact between the substrate and the temperature signal generating device, and to prevent inaccurate measurement of the temperature of the substrate.

17 Claims, 9 Drawing Sheets

APPARATUS FOR MEASURING THE TEMPERATURE OF A SUBSTRATE

BACKGROUND OF THE INVENTION

1. Field of the Invention

The present invention relates to contact type temperature measuring apparatuses which measure the temperature of a substrate (hereinafter referred to as a "wafer") undergoing the heat treatment, when various heat treatments are applied to various kinds of wafers, such as a semiconductor wafer, by a heat treatment apparatus such as a light irradiation heating apparatus (a lamp annealer), a sputtering apparatus, a CVD (Chemical Vapor Deposition) apparatus and an epitaxial growth apparatus. In particular, the present invention relates to technology with which, in an apparatus which measures the temperature of a wafer by making a temperature sensing element in contact therewith, contact between the wafer and the temperature sensing element can be easily sensed.

2. Description of the Related Art

When a semiconductor device or the like is manufactured by applying various kinds of heat treatments to a wafer in a heating furnace or the like by various kinds of heat treatment apparatuses, it is essential to accurately measure the temperature of the wafer under heat treatment. Methods of measuring the temperature of a wafer are divided into a contact type and a non-contact type. In the contact type method, the temperature of a wafer is measured by making a temperature sensing element of a temperature sensor directly in contact with the wafer. In the non-contact type method, the temperature of a wafer is measured by sensing energy radiated from the surface of the wafer using an infrared radiation thermometer. A contact type wafer temperature measuring apparatus is disclosed in Japanese Patent Laying-Open No. 4-148545, which is a counterpart application of U.S. Ser. No. 07/774,943 now U.S. Pat. No. 5,315,092 in which a part of a temperature sensing element is formed into a flat surface, which supports a part of a wafer, thus making the temperature sensing element in surface contact with the wafer. The structure of the apparatus which measures the temperature of a wafer will be described hereinafter in detail with reference to FIGS. 1 to 3.

FIG. 1 shows one example of a heat treatment apparatus which includes a temperature measuring apparatus of a wafer. In this example, the apparatus is of a light irradiation type. FIG. 1 is a front view of a main portion showing in cross section a part of a schematic structure of the heat treatment apparatus. FIG. 2 is a plan view showing a temperature sensing element of the temperature measuring apparatus, together with a part of a wafer holder (susceptor) of the apparatus shown in FIG. 1 and a wafer. FIG. 3 is a perspective view for explaining a state where a part of the wafer is supported by the temperature sensing element of the temperature measuring apparatus. It should be noted that the temperature sensing element is not shown in FIG. 1, and that the susceptor is not shown in FIG. 3.

Referring to FIG. 1, a schematic structure of a light irradiation type heat treatment apparatus is first described in the following. In the figure, a heating furnace 40 has an opening for insertion and removal of a wafer, and is formed of quartz glass which transmits infrared light. A front chamber 44 formed in a tubular shape is provided in contact with opening 42 of heating furnace 40. A lid 46 is provided so as to close a front end opening surface of front chamber 44. A resin packing 48 is attached to a surface of front chamber 44 abutting lid 46, for hermetically sealing heating furnace 40 when heating furnace 40 is sealed by lid 46. A plurality of light sources 50 for irradiating light, such as a halogen lamp or a xenon arc lamp, are disposed above and under heating furnace 40, opposing an upper wall surface and a lower wall surface of heating furnace 40, respectively. At the back of light sources 50, reflectors 52 are provided.

A susceptor 54 formed of quartz is fixed to an inner surface of lid 46. Susceptor 54 has a wafer supporting portion 56, on which a wafer 10 is mounted and supported. An outer surface of lid 46 is fixed to a support block 58. By moving support block 58 linearly in the direction of an arrow by a driving mechanism, not shown, lid 46 is opened/closed. At the same time, wafer 10 is carried in and out from heating furnace 40 through opening 42. When a plurality of wafers are subjected to heat treatment one by one, wafer 10 after treated is carried out from heating furnace 40and removed from susceptor 54 by a feed arm, not shown. Then, a wafer to be treated next is mounted onto susceptor 54 by the feed arm. The wafer to be treated next is again carried into heating furnace 40 for the next heat treatment operation.

As shown in FIG. 2, wafer 10 is supported horizontally at three points by two projecting supporting portions 62, 62 formed projecting from an annular portion 60 at the tip of susceptor 54 of quartz, and a tip portion of a temperature sensing element 64 of the temperature measuring apparatus. Susceptor 54 and temperature sensing element 64 are fixed at a portion, not shown, to be horizontally held. Temperature sensing element 64 includes, for example, a sheathed thermocouple, and a capillary coating member coating the entire sheathed thermocouple. The coating member is formed of SiC (silicon carbide) of high purity manufactured with, for example, a CVD method. Since such a coating member is highly heat resistant, has high thermal conductivity, and is formed into a thin capillary shape, the coating member has an extremely small heat capacity as compared to wafer 10. In addition, since the coating member does not include impurity which might cause contamination of the surface of wafer 10, the coating member will not contaminate wafer 10. The sheathed thermocouple, with a sheathed portion of an outer diameter of approximately 0.3 mm and a length of approximately 200 mm, for example, is inserted deep into the capillary coating member to the vicinity of the tip.

As shown in FIG. 3, the coating member is formed in a shape of a long thin annular tube with the tip clogged. The coating member has an outer diameter of approximately 0.8 mm, an inner diameter of 0.4 mm, and a length of approximately 200 mm, for example. The tip portion of the coating member is processed into a flat surface 66 of a width of approximately 0.5 mm and a length of approximately 15 mm, for example. Temperature sensing element 64 is disposed so as to be in surface contact with wafer 10 at flat surface 66 of its tip portion.

Temperature sensing element 64 having the above-described structure supports wafer 10 with flat surface 66 at its tip portion over approximately 10 mm from its tip, and is kept in contact with wafer 10. During heat treatment of wafer 10 by the light irradiation type heat treatment apparatus as shown in FIG. 1, when the surface temperature of wafer 10 increases, the coating member of temperature sensing element 64 is also heated by thermal conduction. The coating member of temperature sensing element 64 has very high thermal conductivity because of a substantially smaller heat capacity as compared to wafer 10 and surface contact with wafer 10. Therefore, the coating member of temperature sensing element 64 is heated by thermal conduction to quickly attain the same temperature as that of wafer 10. The sheathed thermocouple inserted into the vicinity of the tip of the coating member can measure the temperature of the tip portion of the coating member accurately.

When the temperature of the wafer is measured by the temperature sensing element of the temperature measuring apparatus directly in contact with the wafer as described above, the temperature measuring accuracy largely depends on a state of contact between the temperature sensing element and the wafer. Failure in mounting of the wafer on the susceptor, deterioration of a wafer in shape, such as curvature, and poor setting of the susceptor or the temperature sensing element might cause poor contact between the temperature sensing element and the wafer, resulting in failure of accurate measurement of temperature of the wafer. Therefore, it is necessary to check contact between the wafer and the temperature sensing element.

It has conventionally been determined whether the state of contact is appropriate or not based on visual check and observation of a treated wafer. More specifically, after it is visually confirmed that the temperature sensing element and the wafer are in contact with each other appropriately, heat treatment is actually applied to the wafer. After heat treatment, the wafer is tested. Based on the test result, it is determined whether or not the wafer is heat-treated at a target temperature. It has been thus recognized conventionally that the state of contact was appropriate.

However, in the manufacturing process of a semiconductor device, for example, if wafers are heat-treated while being checked one by one as described above, productivity is considerably lowered. In order to avoid reduction of productivity, it is possible to carry out the above-described checking once each time hundreds or thousands of wafers are heat-treated. However, in this case, it is not possible to check deterioration of the state of contact between the temperature sensing element and the wafer which might occur for some reason during a series of heat treatments. There is a possibility that unfavorable heat treatment might be continued until the next checking operation is carried out, thus reducing the yield.

SUMMARY OF THE INVENTION

One object of the present invention is, therefore, to provide, in a contact type apparatus applying heat treatment to a substrate while measuring the temperature of the substrate, a substrate temperature measuring apparatus having the result that unfavorable heat treatment can be prevented which otherwise would be caused by inaccurate measurement of the temperature of the substrate.

Another object of the present invention is to provide, in a contact type apparatus applying heat treatment to a substrate while measuring the temperature of the substrate, a substrate temperature measuring apparatus having the result that the temperature of the substrate can be measured accurately, thereby making it possible to prevent unfavorable heat treatment.

A still another object of the present invention is to provide, in a contact type apparatus applying heat treatment to a substrate while measuring the temperature of the substrate, a substrate temperature measuring apparatus having the result that desired contact between the substrate and the apparatus for measuring the temperature of the substrate is reliably established, thereby making it possible to measure the temperature of the substrate accurately.

A further object of the present invention is to provide, in a contact type apparatus applying heat treatment to a substrate while measuring the temperature of the substrate, a substrate temperature measuring apparatus which can detect whether or not the substrate and the apparatus for measuring the temperature of the substrate are in secure contact, thereby making it possible to measure the temperature of the substrate accurately.

A still further object of the present invention is to provide, in a contact type apparatus applying heat treatment to a substrate while measuring the temperature of the substrate, a substrate temperature measuring apparatus which can detect whether or not the substrate and the apparatus for measuring the temperature of the substrate are in secure contact based on a manner of temperature change of the apparatus for measuring the temperature of the substrate after contacting the substrate, thereby making it possible to measure the temperature of the substrate accurately.

The substrate temperature measuring apparatus according to the present invention includes a temperature signal generating device provided in contact with a substrate for generating a signal indicating its own temperature which follows the temperature of the substrate by thermal conduction, a device connected and responsive to the output of the temperature signal generating device for determining whether a state of contact between the substrate and the temperature signal generating device is appropriate or not, and a device for carrying out a predetermined process according to a determination result of the determining device.

The temperature of the temperature signal generating device changes following the temperature of the substrate by contacting the substrate. The manner of change reflects the state of contact between the temperature signal generating device and the substrate. It is determined whether the state of contact between the temperature signal generating device and the substrate is appropriate or not based on the output of the temperature signal generating device. According to the determination result, it is possible to apply a predetermined process, for example, heat treatment, to the substrate, to stop applying heat treatment to the substrate, or to further give a necessary alarm.

According to another aspect of the present invention, the determining device detects contact in an undesired state between a substrate and a temperature signal generating device based on change of the output of the temperature signal generating device after the temperature signal generating device first comes in contact with the substrate. At the time of heat treatment, the temperature of the temperature signal generating device has been high due to its contact with the heated substrate. Even after the heated substrate is removed from the temperature signal generating device after its heat treatment is completed, the temperature signal generating device lowers its temperature relatively slowly. However, when the next substrate comes in contact with the temperature signal generating device, the temperature signal generating device drops its temperature rapidly since the next substrates is at room temperature. The manner of this change reflects the state of contact between the substrate and the temperature signal generating device. Therefore, contact in an undesired state between the substrate and the temperature signal generating device can be detected based on change of the output of the temperature signal generating device at this time, thereby making it possible to prevent inaccurate measurement of the substrate temperature.

According to a still another aspect of the present invention, the substrate temperature measuring apparatus includes a device for calculating a characteristic value of change of the output of a temperature signal generating device, for example, a rate of attainment to be described later, after the temperature signal generating device first comes in contact with a substrate, and a device responsive to the output of the calculating device for testing the satisfaction of a predetermined condition of the characteristic value. A characteristic value has been calculated with the same method based on behavior of the temperature measuring apparatus whose favorable contact with the substrate is confirmed, and the value has been prestored. It is determined that the predetermined condition is satisfied if the calculated characteristic value is the prestored characteristic value or more.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
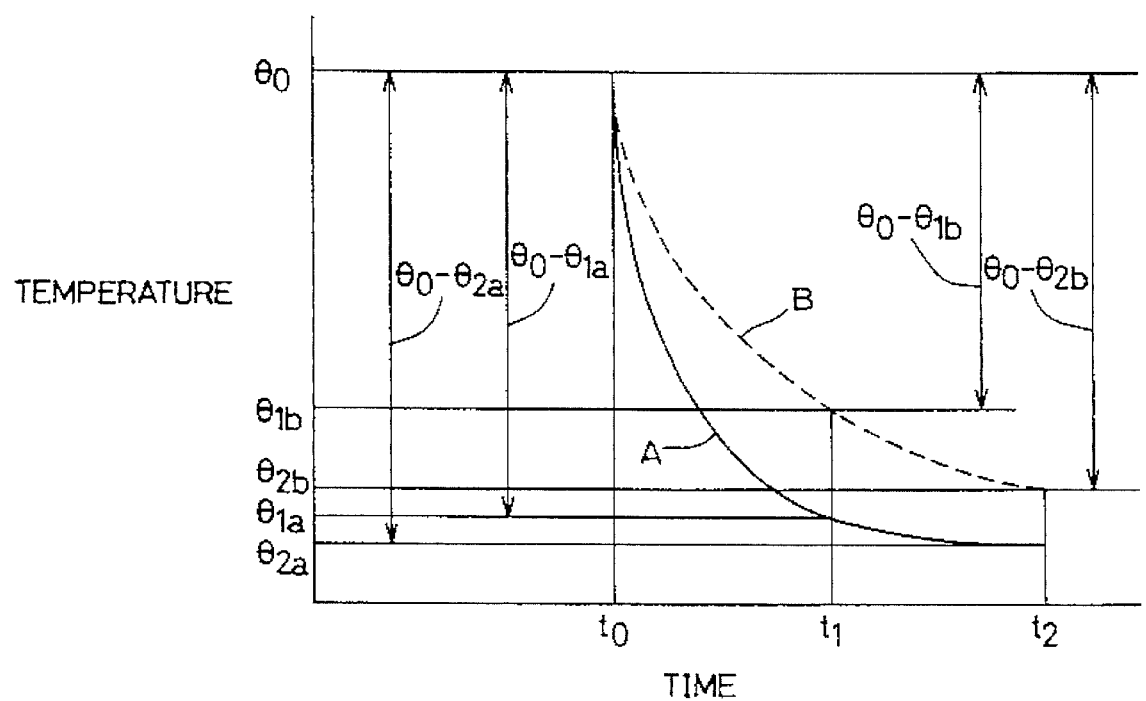
FIG. 4 is a graph for explaining a specific example of a method of determining whether a state of contact between the temperature sensing element and a substrate is appropriate or not in the substrate temperature measuring apparatus according to the present invention.

Referring to FIG. 4, the following is the principle of a method of determining whether or not a temperature sensing element is in secure contact with a wafer.

Suppose that a wafer heated to approximately 300° C. to 500° C. is carried out from a heating furnace after the heat treatment. The temperature sensing element, being in contact with the wafer, is approximately at the same temperature. After the heat treated wafer is unloaded from the susceptor and just before a wafer to be treated is mounted on the susceptor, the temperature sensing element has been cooled to approximately 100° C. to 250° C.

On the other hand, a wafer to be treated next is at room temperature. When the wafer is mounted on the susceptor and made in contact with the temperature sensing element, the temperature sensing element is cooled rapidly because of thermal conduction to the wafer at a lower temperature. Change over time of the temperature of the temperature sensing element at this time largely depends on a state of contact with the wafer. For example, the temperature drops more slowly if a state of contact is not appropriate than in the case where the contact is appropriate.

The present invention makes use of such a fact. More specifically, temperature change is calculated in advance as to the case where the temperature sensing element is appropriately in contact with the wafer. The appropriate temperature change is compared with actual temperature change when a wafer to be treated is made in contact with the temperature sensing element. Based on the comparison result, a state of contact between the wafer to be treated and the temperature sensing element is sensed.

A specific example of the sensing method is as follows.

Let $t_0$ be a time when the wafer at room temperature is mounted on the susceptor in contact with the temperature sensing element. Let $\theta_0$ be the temperature of the temperature sensing element at $t_0$. FIG. 4 shows one example of change over time of the temperature of the temperature sensing element after $t_0$. In the figure, a curve A shows temperature change when a state of contact between the temperature sensing element and the wafer is appropriate. A curve B shows temperature change when the state of contact is not appropriate. As is shown in the figure, when contact between the temperature sensing element and the wafer is appropriate, the temperature drops more rapidly than would be otherwise. This is because heat is conducted from the wafer to the temperature sensing element rapidly.

Let $\theta_2 a$ and $\theta_2 b$ be respective temperatures on curves A and B at a time $t_2$ which is a predetermined time (for example, five seconds) after the time $t_0$. Let $\theta_1 a$ and $\theta_1 b$ be respective temperatures on curves A and B at a time $t_1$ between $t_0$ and $t_2$ (for example, 1.5 seconds after the time $t_0$). Let Ra and Rb be ratios (hereinafter referred to as a "rate of attainment") of amounts of temperature drop from $t_0$ to $t_1$ ($\theta_0-\theta_1 a$, $\theta_0-\theta_1 b$) to amounts of temperature drop from $t_0$ to $t_2$ ($\theta_0-\theta_2 a$, $\theta_0-\theta_2 b$), respectively. Ra and Rb are represented by the following equations (1) and (2), respectively.

$$Ra=(\theta_0-\theta_1 a)/(\theta_0-\theta_2 a)\times 100 \ (\%) \quad (1)$$

$$Rb=(\theta_0-\theta_1 b)/(\theta_0-\theta_2 b)\times 100 \ (\%) \quad (2)$$

According to the equations (1) and (2), Ra>Rb holds. The present invention makes use of such a relationship between Ra and Rb. More specifically, a reference rate of attainment for determining whether or not contact between the temperature sensing element and the wafer is appropriate is set in advance as Rth (Ra≧Rth>Rb). The rate of attainment R is calculated for every wafer to be treated. If R≧Rth holds, it is determined that the contact is appropriate. If R<Rth, it is determined that the contact is not appropriate.

Preferred embodiments of the present invention will now be described with reference to the drawings.

Figure 2:
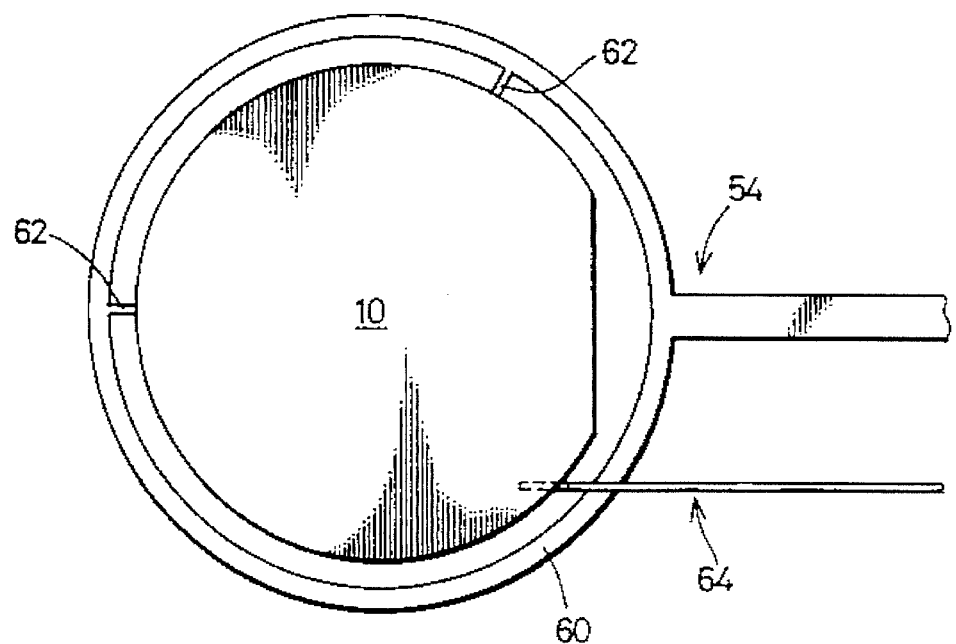
FIG. 2 is a plan view showing a temperature sensing element of the substrate temperature measuring apparatus with a wafer and a part of a wafer holder (a susceptor) of the heat treatment apparatus shown in FIG. 1.
Figure 3:
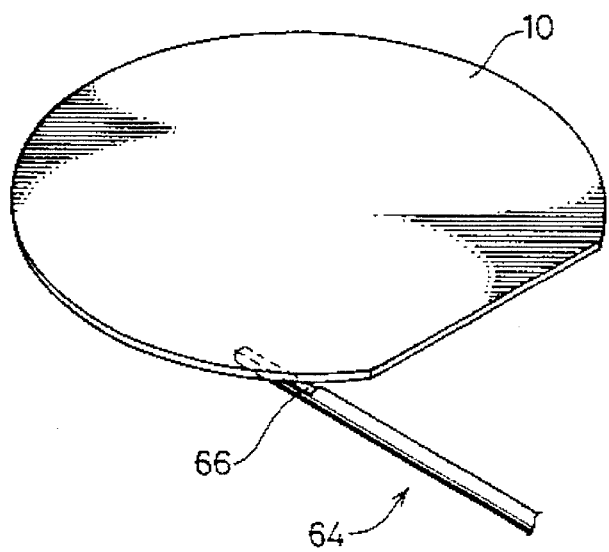
FIG. 3 is a perspective view for explaining a state of the temperature sensing element of the substrate temperature measuring apparatus supporting a part of the wafer.
Figure 5:
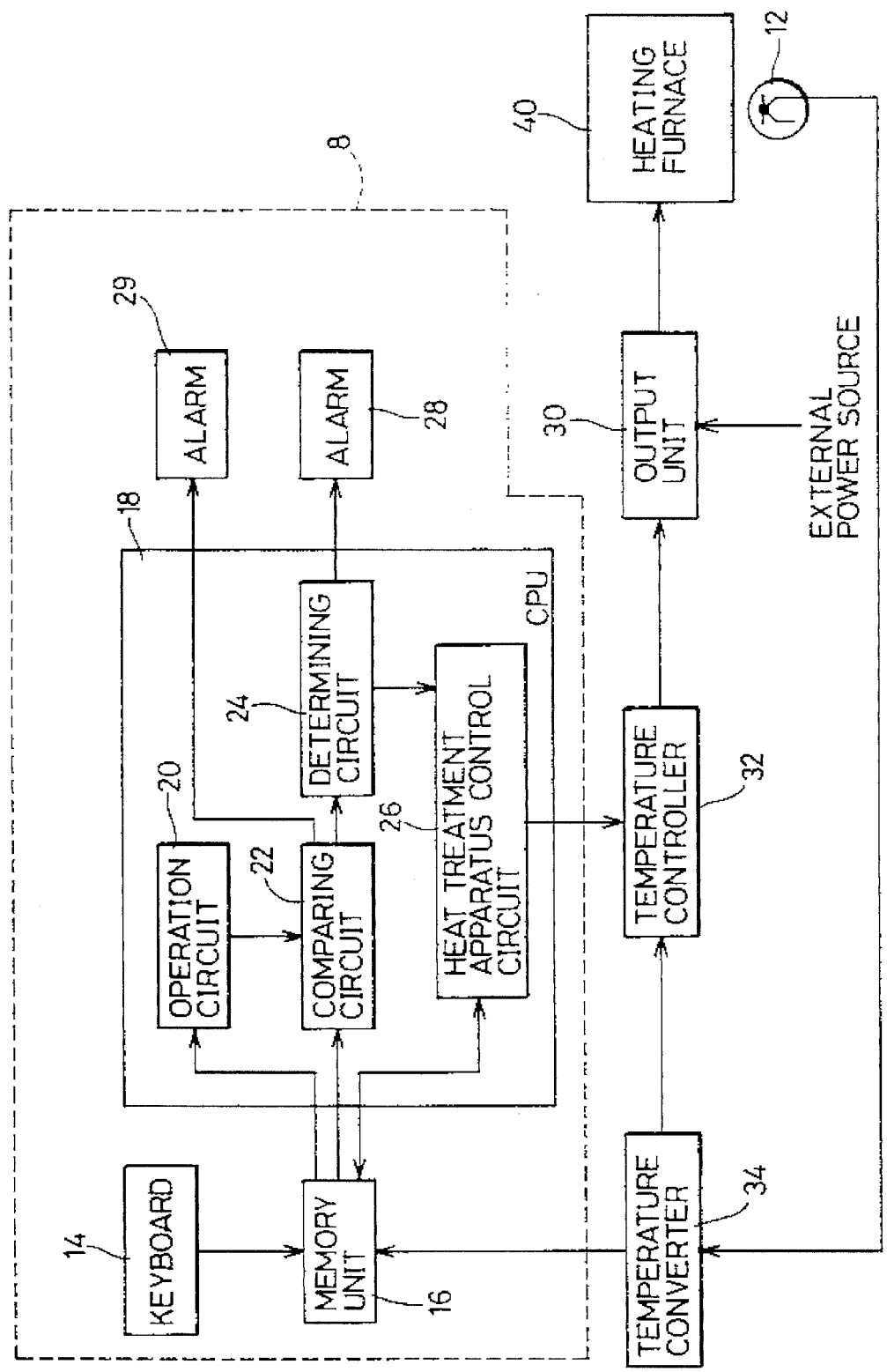
FIG. 5 is a block diagram showing one example of a schematic structure of the substrate temperature measuring apparatus according to the present invention together with a part of a structure of the heat treatment apparatus.

FIG. 5 is a block diagram showing one example of a schematic structure of a wafer temperature measuring apparatus according to the present invention, together with a part of a structure of a heat treatment apparatus. Since a structure example of the heat treatment apparatus in which the wafer temperature measurement apparatus is used and a structure example of the temperature sensing element of the temperature measuring apparatus has already been described with reference to FIGS. 1 to 3, detailed description thereof will not be repeated here.

Referring to FIG. 5, the heat treatment apparatus includes a heating furnace 40, a computer 8 implementing a part of functions of the wafer temperature measuring apparatus and a function of controlling heating furnace 40, an output unit 30, a temperature controller 32, and a temperature converter 34.

Output unit 30 has a thyrister SCR (Semiconductor-Controlled Rectifier) included therein. Output unit 30 is responsive to the output of temperature controller 32 and controls the output of light sources 50 (cf. FIG. 1) disposed in heating furnace 40. Temperature controller 32 provides a drive signal to output unit 30 in response to a temperature detect signal detected by a temperature sensing element 12 and applied through temperature converter 34, and a control signal transmitted from computer 8. Computer 8 includes a keyboard 14, a memory unit 16, a CPU (Central Processing Unit) 18, and alarms 28 and 29. CPU 18 implements an operation circuit 20, a comparing circuit 22, a determining circuit 24, and a heat treatment apparatus control circuit 26 by executing programs.

Keyboard 14 is provided for input of a characteristic value representing a state of temperature change over time of temperature sensing element 12 in the case where temperature sensing element 12 under a heated condition and a wafer at room temperature are appropriately in contact with each other. One example of such a characteristic value is the above-described reference rate of attainment Rth. Memory unit 16 is provided for storing the reference rate of attainment Rth entered through keyboard 14, and for storing the temperature of the wafer detected by temperature sensing element 12 after a predetermined time, for example, 1.5 seconds and 5.0 seconds.

Operation circuit 12 is provided for calculating the rate of attainment R based on temperatures detected at stated predetermined times and stored in memory unit 16. The rate of attainment R is merely an example. Other numerical values can be used which show temperature change over time of temperature sensing element 12 when a wafer at room temperature comes into contact with heated temperature sensing element 12. Comparing circuit 22 is provided for comparing the rate of attainment R calculated by operation circuit 20 with the reference rate of attainment Rth stored in memory unit 16. Based on the comparison result, determining circuit 24 determines whether a state of contact between temperature sensing element 12 and a wafer to be treated is appropriate or not.

When it is determined by determining circuit 24 that a state of contact between temperature sensing element 12 and a wafer to be treated is not appropriate, an alert signal is transmitted from determining circuit 24 to alarm 28. Alarm 28 informs the operator of an unfavorable state of contact between temperature sensing element 12 and a wafer to be treated by indicating an error message on a display screen or giving alarm sound. At the same time, an alert signal is transmitted from determining circuit 24 to heat treatment apparatus control circuit 26. Programmed driving of light sources 50 is halted. Alternatively, light sources 50 are driven at low output to only retain heat in heating furnace 40. Furthermore, a driving mechanism, not shown, is controlled to prevent susceptor 54 holding a wafer to be treated from being carried into heating furnace 40, whereby the wafer is not subjected to the heat treatment process.

When it is determined by determining circuit 24 that a state of contact between temperature sensing element 12 and a wafer to be treated is appropriate, a normal signal is transmitted from determining circuit 24 to heat treatment apparatus control circuit 26, so that the process goes to the heat treatment of the wafer.

Based on a program stored in memory unit 16, heat treatment apparatus control circuit 26 transmits to temperature controller 32 a control signal for controlling the output of light sources 50 when the wafer is subjected to heat treatment.

Figure 6:
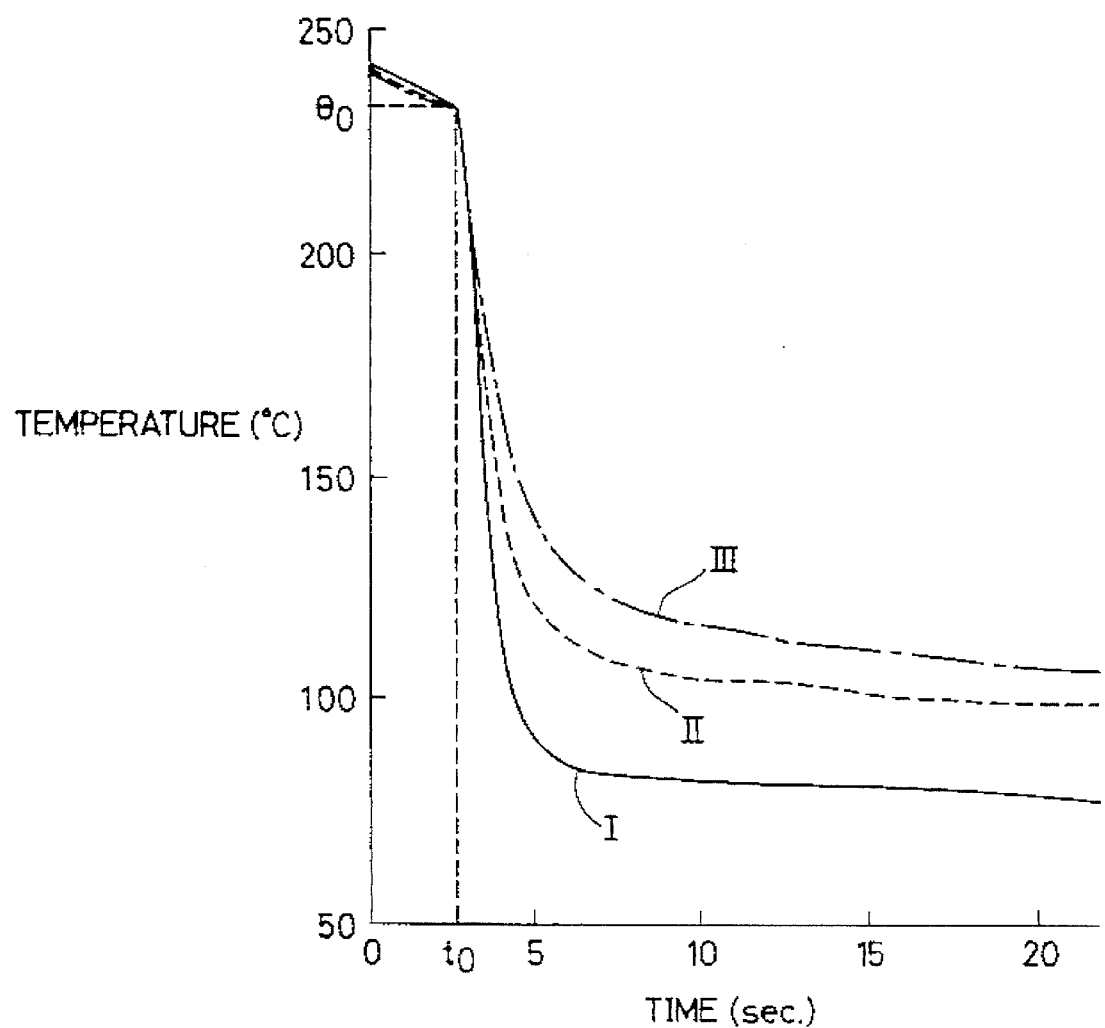
FIG. 6 is a graph showing a drop of the temperature of the temperature sensing element versus time when a wafer at room temperature comes into contact with the heated temperature sensing element.
Figure 7:
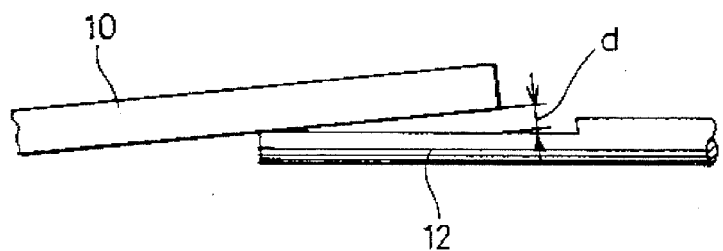
FIG. 7 is a partially enlarged view showing a state where the wafer is in contact with the temperature sensing element.

FIG. 6 shows a temperature drop of the temperature sensing element versus time when a wafer at room temperature (23° C.) is made in contact with a heated temperature sensing element. In FIG. 6, a curve I shows temperature change of temperature sensing element 12 when a gap d between wafer 10 and temperature sensing element 12 shown in FIG. 7 is 0 μm. A curve II shows temperature change of temperature sensing element 12 when the gap d is 20 μm. A curve III shows temperature change of temperature sensing element 12 when the gap d is 50 μm.

As is clear from FIG. 6, a manner of temperature change of temperature sensing element 12 differs depending on a state of contact between temperature sensing element 12 and wafer 10. As described above, it is possible to determine whether a state of contact between temperature sensing element 12 and wafer 10 is appropriate or not, based on a numerical value representing a manner of temperature change over time of temperature sensing element 12, for example, the rate of attainment.

Referring to flow charts shown in FIGS. 8 to 11, one example of the sensing operation by the wafer temperature measuring apparatus will be described.

Figure 1:
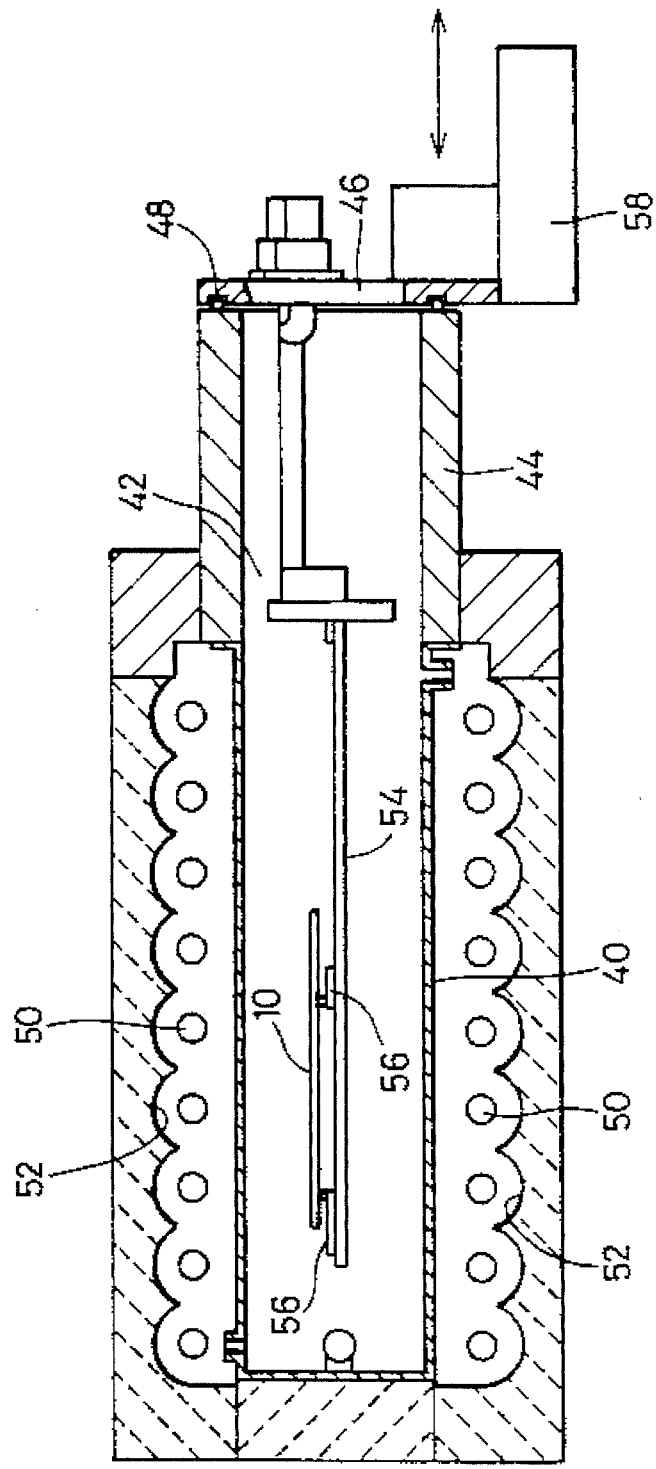
FIG. 1 is a front view of a main portion, partly illustrated in cross section, showing one example of a schematic structure of a heat treatment apparatus (a light irradiation type heating apparatus) in which a substrate temperature measuring apparatus is used.

Referring to FIG. 1, susceptor 54 holding wafer 10 after heat treatment is carried out from heating furnace 40. Wafer 10 after heat treatment is unloaded from susceptor 54 by a feed arm. Then, wafer 10 to be treated next is mounted on susceptor 54 by the feed arm.

Figure 8:
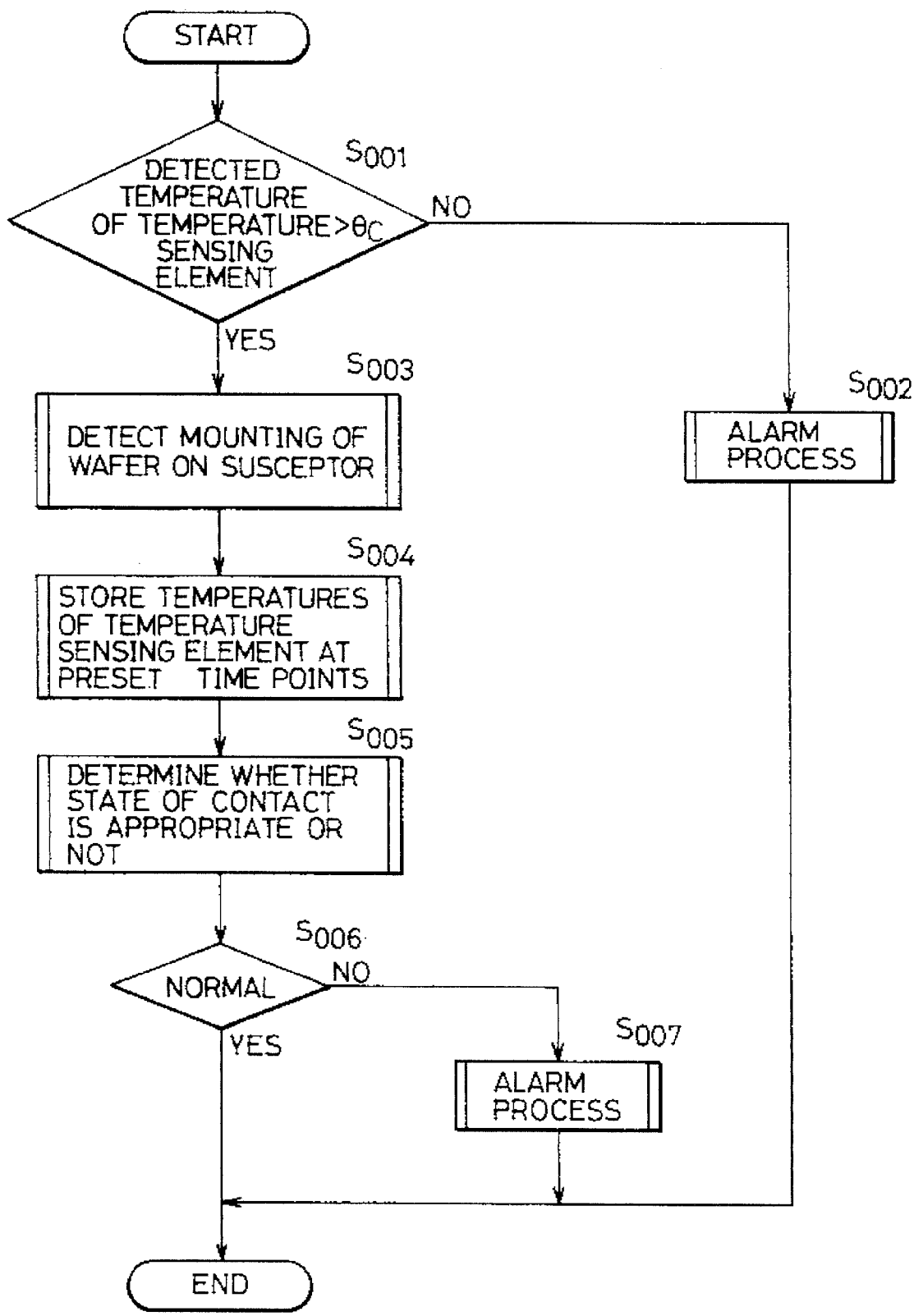
FIG. 8 is a flow chart for explaining one example of sensing operation carried out by the substrate temperature measuring apparatus according to the present invention.

Referring to FIG. 8, it is first determined whether a temperature detect signal applied-from temperature sensing element 12 (FIG. 5) through temperature converter 34 (FIG. 5) indicates a temperature close to a predetermined high temperature ($\theta_0$) (S001). This determination is made by determining whether the applied temperature detect signal indicates a temperature higher than a predetermined threshold value ($\theta c$: for example, 100° C.) prestored by memory unit 16 based on the comparison by comparing circuit 22.

If the applied temperature detect signal indicates a temperature of the predetermined threshold value $\theta c$ or less, control goes to step S002. At step S002, a temperature measuring apparatus alert signal, informing that an apparatus relating to temperature measurement is out of order, is provided to second alarm 29. Alarm 29 carries out an alarm process of indicating an error message on a display screen or the like. As a result, even if temperature sensing element 12 and temperature converter 34 are out of order, there is no possibility of determining by mistake that a substrate is not mounted although actually mounted, because of difficulty in calculation or erroneous calculation of a temperature drop rate of the temperature sensing element.

If the temperature detect signal exceeds the threshold value $\theta c$, control goes to step S003. It is detected that wafer 10 to be treated is mounted on susceptor 54 (S003). This detection is made by checking a rate of temperature change of temperature sensing element 12 (S101), for example, as shown in FIG. 9.

Figure 9:
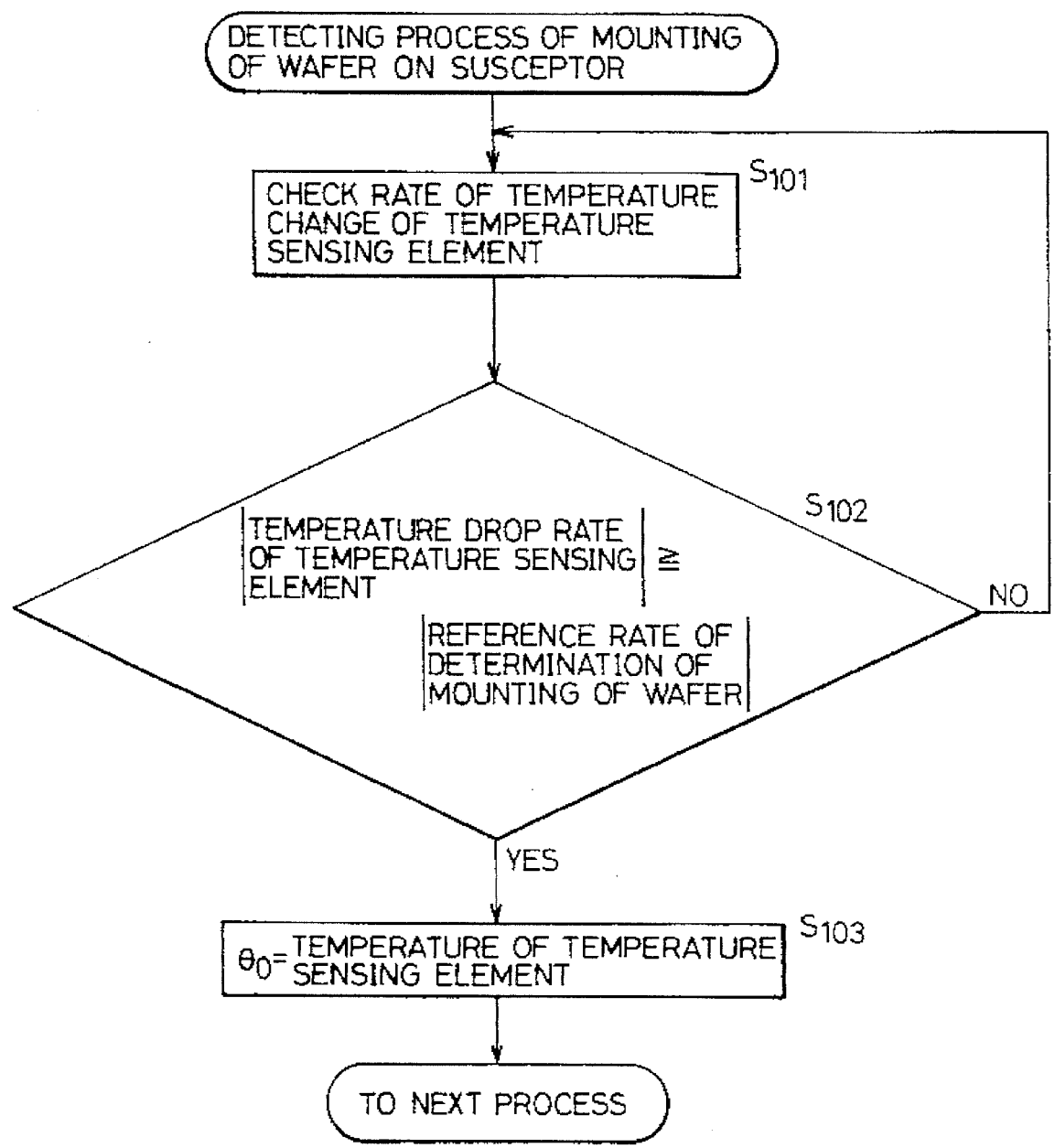
FIG. 9 is a flow chart for explaining one example of a process of detecting that a wafer is mounted onto the susceptor during the sensing operation shown in FIG. 8.

Referring to FIG. 9, when wafer 10 at room temperature is mounted on susceptor 54, temperature sensing element 12 comes into contact with wafer 10, causing a rapid drop in the temperature of temperature sensing element 12. A reference temperature drop rate of temperature sensing element 12 at which it is to be determined that a wafer has been mounted on susceptor 54 is obtained in advance by experiment. When the measured temperature drop rate takes a value equal to or larger than the reference rate (S102), it is determined that wafer 10 has been mounted on susceptor 54. A temperature $\theta_0$ of temperature sensing element 12 at $t_0$ is stored in memory unit 16 (S103).

Figure 10:
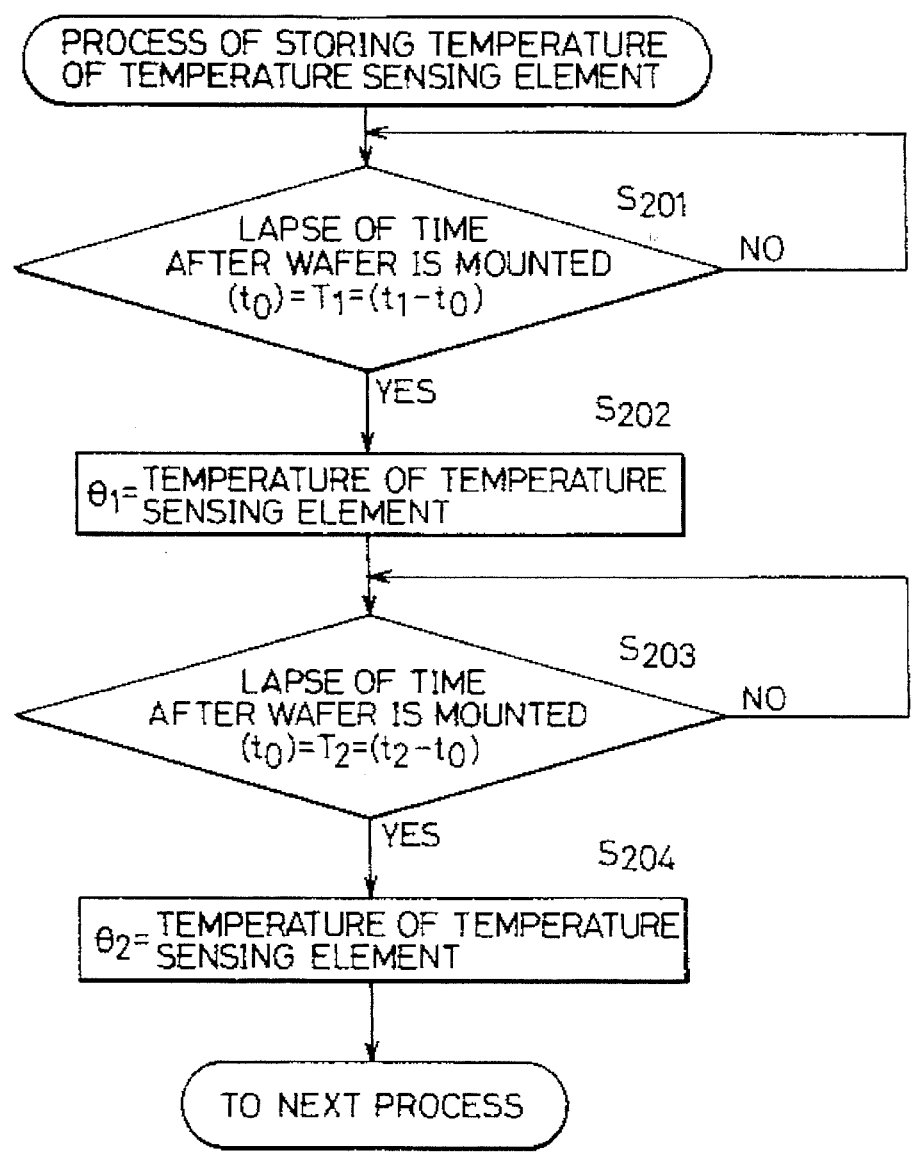
FIG. 10 is a flow chart for explaining one example of a process of storing the temperature of the temperature sensing element during the sensing operation shown in FIG. 8.

Temperatures of temperature sensing element 12 at preset times are sequentially stored in memory unit 16 (S004). According to this process, as shown in FIG. 10, a temperature $\theta_1$ of temperature sensing element 12 at $t_1$ after the lapse of $T_1$ (1.5 seconds) from $t_0$ at which wafer 10 is mounted on susceptor 54 (S201) is stored in memory unit 16 (S202). Furthermore, a temperature $\theta_2$ of temperature sensing element 12 at $t_2$ after the lapse of $T_2$ (5.0 seconds) from $t_0$ (S203) is stored in memory unit 16 (S204).

After the storing process of temperatures of temperature sensing element 12 is completed, as shown in FIG. 8, it is determined whether a state of contact between temperature sensing element 12 and wafer 10 is appropriate or not (S005). This determination is carried out as follows. First, the rate of attainment R is calculated according to the following equation in operation circuit 20, comparing circuit 22, and determining circuit 24.

$$R=(\theta_0-\theta_1)/(\theta_0-\theta_2)\times 100 \; (\%) \qquad (3)$$

The calculated rate of attainment R is compared with the reference rate of attainment Rth obtained in advance by experiment. IF $R \geq Rth$ holds, it is determined that the contact is appropriate, and if $R<Rth$ holds, it is determined that the state of contact is not appropriate (S006).

Figure 11:
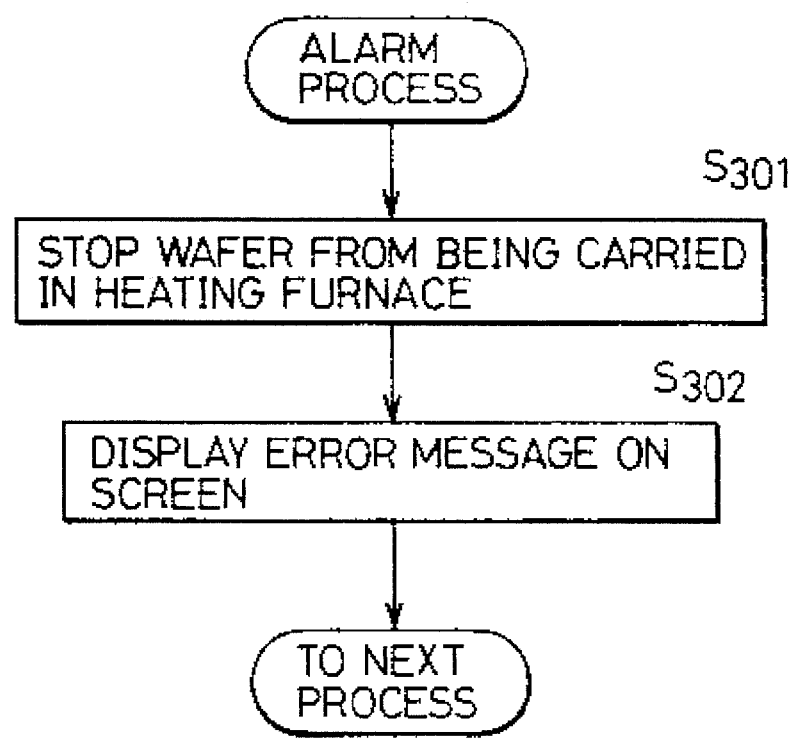
FIG. 11 is a flow chart for explaining one example of an alarm process during the sensing operation shown in FIG. 8.

When it is determined that the contact between temperature sensing element 12 and wafer 10 is appropriate, the process goes to heat treatment of wafer 10. When it is determined that the contact between temperature sensing element 12 and wafer 10 is not appropriate, an alarm process is carried out (S007). In the alarm process, as shown in FIG. 11, for example, wafer 10 to be treated is prevented from being carried in heating furnace 40 (S301), and an error message is displayed on a display screen of alarm 28 (S302). Advantageously, the means for carrying out a predetermined heat treatment comprises means responsive to a determination that a state of contact between the substrate and the temperature signal generating means is not appropriate by the determining means, for giving an alarm.

The wafer temperature measuring apparatus according to the present invention has a structure as described above. However, the scope of the present invention is not limited by the above-described description and the contents of the drawings, but may include various modifications without departing from the gist of the present invention.

For example, in the above-described description, it was determined whether a state of contact between a temperature sensing element and a substrate is appropriate or not by using a parameter called a rate of attainment. However, the determination may be made using another value as a parameter. Examples of such parameters include an amount of temperature drop of a temperature sensing element a predetermined time after the temperature sensing element comes into contact with the substrate, or a temperature gradient at a predetermined time. While the temperature sensing element should be of a type directly in contact with a wafer for measuring the temperature thereof, the structure and the shape of the temperature sensing element are not limited to those of the above-described embodiment. Furthermore, in the above-description, a light irradiation type heat treatment apparatus was shown as a heat treatment apparatus. However, the present invention is not limited thereto, but may be applied to a wafer temperature measuring apparatus in a sputtering apparatus, a CVD apparatus, an epitaxial growth apparatus or the like. In the above-described embodiment, a susceptor and a temperature sensing element are inserted and removed in and from a heating furnace. However, the wafer temperature measuring apparatus of the present invention can be applied to a heat treatment apparatus, having a susceptor and a temperature sensing element fixed in a heating furnace, in which a wafer is carried in and out from the heating furnace by a feed arm, and in which the wafer is moved between the susceptor fixed in the furnace and the feed arm.

The means for detecting the first contact time employed in the present invention can comprise means for detecting a greater change of the output of the temperature signal generating means, and means for detecting when said detected rate of change is greater than a predetermined value and generating a signal indicating that the first contact time is detected. The means for detecting the first contact time can further include means for detecting failure in the temperature signal generating means to generate a failure detect signal, and means responsive to said failure detect signal for giving an alarm.

As described above, according to the present invention, when heat treatment is applied to various substrates using various heat treatment apparatuses, a substrate temperature measuring apparatus can be provided which can measure the substrate temperature. Since a state of contact between the substrate and the temperature sensing element can be automatically sensed before heat treatment, it is possible to ensure reliability of temperature measurement without impairing productivity. In addition, it is possible to prevent reduction of the yield of a substrate in heat treatment by an advance prevention of unfavorable heat treatment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system comprising:

(1) an apparatus for heat treating a substrate;

(2) a substrate temperature measuring apparatus comprising:

temperature signal generating means provided in contact with the substrate for generating a signal indicating its own temperature which follows a temperature of the substrate by thermal conduction;

means connected to an output of said temperature signal generating means and responsive to the output of said temperature signal generating means for determining whether a state of contact between the substrate and said temperature signal generating means is appropriate or not; and means responsive to a determination result of said determining means for causing heating of the substrate, discontinuing heating of the substrate or an alarm to be given.

2. The system as recited in claim 1, wherein said determining means includes means for detecting an undesired state of contact between the substrate and said temperature signal generating means based on a change of the output of said temperature signal generating means after a time when said temperature signal generating means first comes into contact with the substrate.

3. The system as recited in claim 2, wherein said detecting means includes means for calculating a characteristic value of the change of the output of said temperature signal generating means after said temperature signal generating means first comes into contact with the substrate, and means responsive to an output of said calculating means for deciding whether said characteristic value satisfies a predetermined condition.

4. The system as recited in claim 3, wherein said means for calculating the characteristic value includes means for calculating a rate of attainment of the output of said temperature signal generating means after said temperature signal generating means first comes into contact with the substrate.

5. The system as recited in claim 4, wherein said means for deciding includes means for storing a prepared reference value, and means for comparing said calculated rate of attainment and said reference value and for outputting a comparison result.

6. The system as recited in claim 5, wherein said means for deciding further includes input means for inputting said reference value to be stored in said storing means.

7. The system as recited in claim 4, wherein said means for calculating the rate of attainment includes means for calculating a rate of attainment R according to the following equation:

$R=(\theta_0-\theta_1)/(\theta_0-\theta_2)$ wherein $\theta_0$, $\theta_1$, $\theta_2$ denote temperature at a predetermined reference time point, a time point later than $\theta_0$ by a predetermined time period, and a time point later than $\theta_1$ by another predetermined time period, respectively.

8. The system as recited in claim 3, wherein said means for calculating the characteristic value includes means for detecting a first contact time between said temperature signal generating means and the substrate, means for sampling the output of said temperature signal generating means a plurality of times after said first contact time is detected, and means for calculating said characteristic value based on values sampled by said sampling means.

9. The system as recited in claim 8, wherein said sampling means includes means for sampling the output of said temperature signal generating means three times after said first contact time is detected, and means for calculating said characteristic value based on the three sampled values.

10. The system as recited in claim 9, wherein said means for sampling the output three times includes means for sampling an output $\theta_0$ of said temperature signal generating means when said first contact time is detected, means for sampling an output $\theta_1$ of said temperature signal generating means at a predetermined time period after said first contact time is detected, and means for sampling an output $\theta_2$ of said temperature signal generating means at another predetermined time period after said output $\theta_1$ is sampled.

11. The system as recited in claim 10, wherein said means for calculating said characteristic value based on said three sampled values includes means for calculating the rate of attainment R as said characteristic value according to the following equation:

$R=(\theta_0-\theta_1)/(\theta_0-\theta_2)$

12. The system as recited in claim 8, wherein said means for detecting said first contact time includes means for detecting a rate of change of the output of said temperature signal generating means, and means for detecting when said detected rate of change is greater than a predetermined value and generating a signal indicating that said first contact time is detected.

13. The system as recited in claim 12, wherein said means for detecting said first contact time further includes means for detecting failure in said temperature signal generating means to generate a failure detect signal, and means responsive to said failure detect signal for giving an alarm.

14. The system as recited in claim 13, wherein said means for detecting failure further includes means for monitoring the output of said temperature signal generating means to decide whether said output retains a predetermined value or a value greater than said predetermined value from a time when a heat-treated substrate is released from a contact state with said temperature signal generating means until said first contact time is detected.

15. The system as recited in claim 1, wherein said means responsive to a determination result includes means responsive to a determination that a state of contact between the substrate and said temperature signal generating means is appropriate by said determining means, for applying said heat treatment to the substrate whose contact with said temperature signal generating means is detected, and means responsive to a determination that a state of contact between the substrate and said temperature signal generating means is not appropriate by said determining means, for stopping the substrate whose contact with said temperature signal generating means is detected from being subjected to said treatment.

16. The system as recited in claim 15, wherein said means responsive to a determination result further includes means responsive to a determination that a state of contact between the substrate and said temperature signal generating means is not appropriate by said determining means, for giving the alarm.

17. A system comprising:

(1) an apparatus for heat treating a substrate;

(2) a substrate temperature measuring apparatus comprising:

temperature signal generating means provided in contact with the substrate for generating a signal indicating its own temperature which follows a temperature of the substrate by thermal conduction;

means connected to an output of said temperature signal generating means and responsive to the output of said temperature signal generating means for determining whether a state of contact between the substrate and said temperature signal generating means is appropriate or not; and means responsive to a determination result of said determining means for causing heating of the substrate, discontinuing heating of the substrate and an alarm to be given.

* * * * *